(12) United States Patent
Iacono

(10) Patent No.: US 10,341,493 B1
(45) Date of Patent: Jul. 2, 2019

(54) CALL REDIRECTION TO CUSTOMER-FACING USER INTERFACE

(71) Applicant: Square, Inc., San Francisco, CA (US)

(72) Inventor: Jeffrey Iacono, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 16/024,504

(22) Filed: Jun. 29, 2018

(51) Int. Cl.
| H04M 7/00 | (2006.01) |
| H04M 3/42 | (2006.01) |
| G06Q 30/06 | (2012.01) |
| G06Q 10/10 | (2012.01) |
| H04M 1/725 | (2006.01) |

(52) U.S. Cl.
CPC ...... H04M 7/0033 (2013.01); G06Q 10/1095 (2013.01); G06Q 30/0613 (2013.01); G06Q 30/0633 (2013.01); H04M 1/72522 (2013.01); H04M 3/42068 (2013.01); H04M 7/0042 (2013.01); H04M 2203/1058 (2013.01)

(58) Field of Classification Search
CPC ......... H04N 21/47202; H04N 7/17318; H04N 2007/145; H04N 21/41407; H04N 21/4223; H04N 21/6582; H04N 21/222; H04N 21/234309; H04N 21/2355; H04N 21/2541; H04N 21/25875; H04N 21/4143; H04N 21/4181; H04N 21/4325; H04N 21/47211

USPC .................................................. 379/88.18
See application file for complete search history.

(56) References Cited

U.S. PATENT DOCUMENTS

| 9,703,988 | B1* | 7/2017 | Sudbury | G06F 21/64 |
| 2005/0149507 | A1* | 7/2005 | Nye | G06F 16/951 |
| 2005/0197767 | A1* | 9/2005 | Nortrup | G01C 21/3667 |
| | | | | 701/420 |
| 2017/0098264 | A1* | 4/2017 | Priebatsch | H04W 4/21 |
| 2017/0228814 | A1* | 8/2017 | Harman | G06Q 30/06 |
| 2017/0289332 | A1* | 10/2017 | Lavian | H04M 1/72519 |

* cited by examiner

Primary Examiner — Akelaw Teshale
(74) Attorney, Agent, or Firm — Lee & Hayes, P.C.

(57) ABSTRACT

Techniques described herein are directed to utilizing an interposing phone number and associated phone tree to direct phone calls intended for a merchant to a customer-facing user interface that facilitates online requests to integrate multiple input channels (e.g., requests made by phone and requests made online) into a single output workflow. An interposing phone number provided by a third-party service can be associated with a merchant profile and an interposing phone tree can be implemented in association with an incoming call directed to the interposing phone number. A path of the interposing phone tree can cause a message including a link to be sent to a mobile device associated with the incoming call. Responsive to receiving an indication of activation of the link, an instruction can be sent to the mobile device causing a customer-facing user interface to be presented to enable a customer to interact with the merchant.

20 Claims, 7 Drawing Sheets

CALL REDIRECTION TO CUSTOMER-FACING USER INTERFACE

BACKGROUND

Conventional systems enable online ordering for pickup and delivery (e.g., "online orders"); however, customers still place calls to merchants to place orders for pickup or delivery (e.g., "phone orders"). Such phone orders are not integrated into fulfillment workflows for online orders, which increases operational overhead and decreases the efficiency with which both online orders and phone orders are fulfilled.

BRIEF DESCRIPTION OF THE DRAWINGS

The above and other features of the present disclosure, its nature and various advantages, will be more apparent upon consideration of the following detailed description, taken in conjunction with the accompanying drawings.

Figure 1:
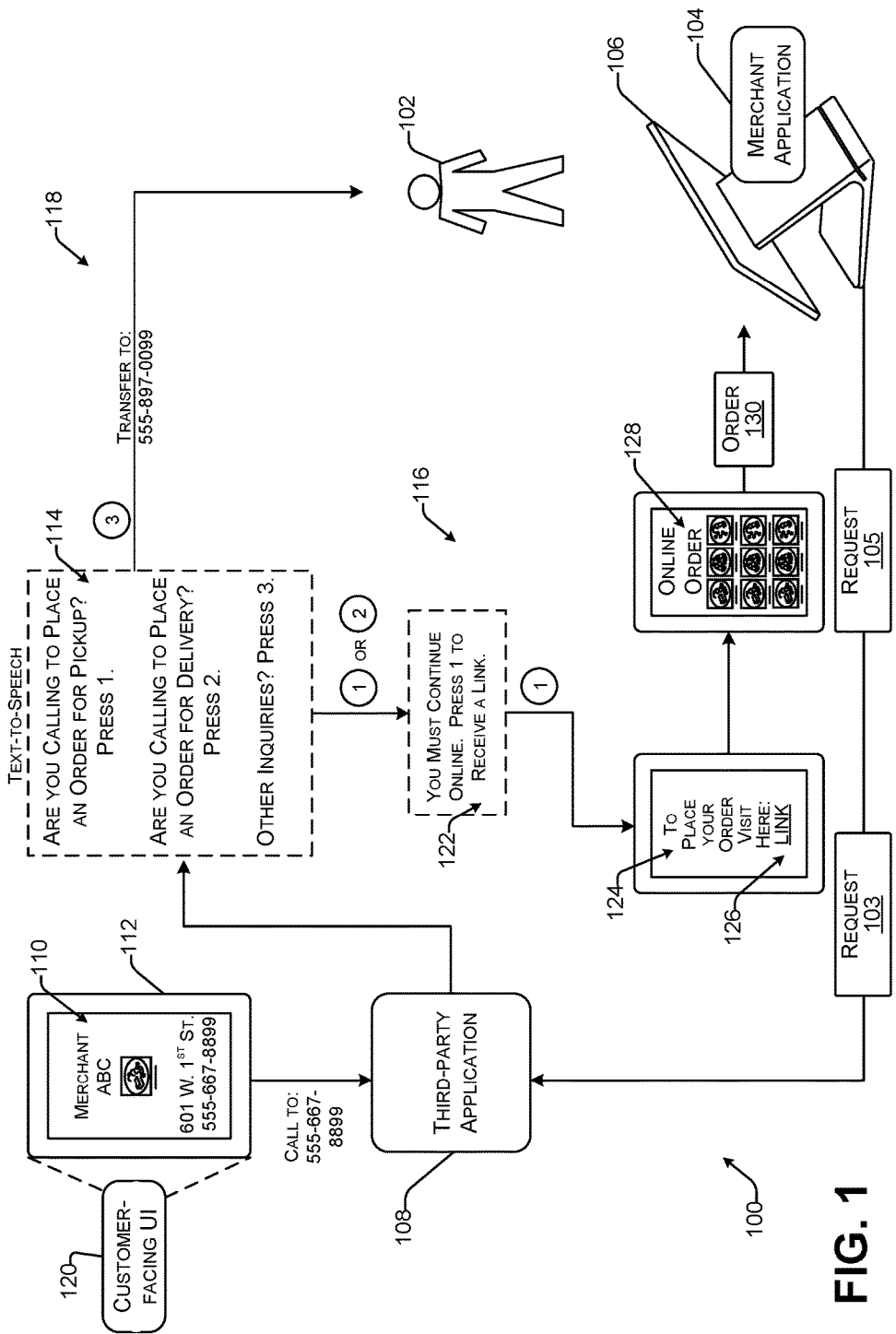
FIG. 1 illustrates an example of utilizing an interposing phone number and associated phone tree to direct phone calls intended for a merchant to a customer-facing user interface that facilitates online requests to integrate multiple input channels (e.g., requests made by phone and requests made online) into a single output workflow.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

Techniques described herein are directed to utilizing an interposing phone number and associated phone tree to direct phone calls intended for a merchant to a customer-facing user interface that facilitates online requests to integrate multiple input channels (e.g., requests made by phone and requests made online) into a single output workflow. In an example, techniques described herein are directed to associating an interposing phone number with a merchant so that the merchant can use the interposing phone number on its website, in marketing, etc. instead of its original phone number. The interposing phone number can direct an incoming call to a third-party application (instead of the merchant's direct line). The interposing phone number can be associated with a phone tree so that when a customer places a call to the interposing phone tree, the third-party application receives the call and implements the interposing phone number. One path of the phone tree can connect the call to the original phone number, thereby directly connecting the customer to the merchant. Another path of the phone tree can redirect the customer to an online platform. The redirection can start with a message that is sent to the mobile device of the customer. The message can include a selectable link that, when selected, enables the mobile device of the customer to present a landing page (e.g., presented via a web browser or application) that allows the customer to make a request, such as, placing an order for pickup, placing an order for delivery, scheduling an appointment, receiving an update regarding a recent order (e.g., fulfillment information), etc.

In an example, a customer can call a published phone number of a merchant. The published phone number is the interposing phone number, unbeknownst to the customer. Responsive to the customer calling the interposing phone number, the customer can be presented with options designated by a phone tree associated with the interposing phone number and instructions for selecting individual of the options. The customer can provide one or more inputs based on the instructions. For instance, responsive to providing an input corresponding to a path of the phone tree that causes a message to be sent to the mobile device of the customer, the customer can receive the message, including a selectable link (as described above), and can select the selectable link. Responsive to selecting the selectable link, the customer can access the landing page via a web browser, an application, etc. The customer can make a request via the landing page such as, placing an order for pickup, placing an order for delivery, scheduling an appointment, receiving an update regarding a recent order (e.g., fulfillment information), etc.

In some examples, the request can be sent to a merchant computing device of the merchant. The merchant can then receive the request and take appropriate action. For instance, if the customer places an order for pickup or delivery, the merchant can prepare the order, just as if the order had come via an online channel originally. That is, such an order can be integrated into a single workflow with other online orders (even though the order originated as a phone call). Or, if the customer schedules an appointment, the merchant can view the appointment in its online calendar, just as if the appointment had been scheduled via an online channel originally. That is, such an appointment can be integrated into a single scheduling system (e.g., online calendar) with other appointments made online (even though the appointment originated as a phone call). As such, techniques described herein are directed to integrating multiple input channels into a single output workflow using an interposing phone number and associated phone tree.

Conventional systems are unable to integrate orders placed online for pickup or delivery and orders placed via a phone call for pickup or delivery into a single workflow. As described above, fulfilling online orders and phone orders is inefficient and causes an increase in operational overhead. Techniques described herein, which are directed to redirecting requests intended to be made by phone to a customer-facing user interface, such as the landing page described above, that facilitates online requests to integrate such phone requests into a single workflow with requests made online, increases fulfillment efficiency and reduces operational overhead. That is, the unconventional multi-channel integration techniques described herein offer improvements to order fulfillment technologies. Such techniques can be useful for handling other requests, too. For instance, techniques described herein can be useful for handling requests to schedule appointments, customer service requests (e.g., fulfillment inquiries), etc. As such, techniques described herein offer increased efficiency and enable merchants to reduce operational overhead by enabling multi-channel integration via the use of interposing phone numbers and associated phone trees, implemented in part, by a third-party application.

FIG. 1 illustrates an example 100 of utilizing an interposing phone number and associated phone tree to direct phone calls intended for a merchant to a customer-facing user interface that facilitates online requests to integrate multiple input channels (e.g., requests made by phone and requests made online) into a single output workflow.

In at least one example, merchant 102 can send a request 103, via a merchant application 104 executing on a merchant device 106, to a third-party application 108. The request 103 can be for an interposing phone number that is different than its original phone number. The third-party application 108 can provide an interposing phone number (555-667-8899) to the merchant 102. The interposing phone number can be different than the original phone number of the merchant 102 and can cause incoming phone calls to be directed to the third-party application 108 instead of the merchant 102. The merchant 102 can utilize the interposing phone number in marketing, place the interposing phone number on its website, or otherwise present the interposing phone number for customers (and others) to view. A non-limiting example of a merchant website 110 is shown in FIG. 1 as being presented via a mobile device 112 operable by a customer (not shown).

The merchant application 104 can send a request 105 to the third-party application 108 to associate a phone tree 114 with the interposing phone number. The phone tree 114 can be an option-driven system that routes callers to recordings, more options, or a person, depending on their interactions with a list of options. In at least one example, the phone tree 114 can be provisioned as a code block, or other computer-readable instructions, from the merchant application 104 to the third-party application 108. The third-party application 108 can associate the phone tree 114 with the interposing phone number.

In at least one example, the phone tree 114 can have two or more paths: path 116 and path 118. A first path 116 can direct a customer to a customer-facing user interface 120. In at least one example, each path can be associated with an input such that when the customer provides the respective input, corresponding actions are taken. The input can be a spoken input (e.g., which can be processed by voice recognition software), a touch input (e.g., via a touchscreen display, keyboard, touchpad, etc.), etc. In at least one example, the input drives the interaction between the customer and the third-party application 108. A second path 118 can connect an incoming phone call directed to the interposing phone number to the original phone number of the merchant 102.

In at least one example, a customer can place a call via the mobile device 112 to the interposing phone number. The call can be directed to the third-party application 108. Upon receiving the call, the third-party application 108 can access the phone tree 114 associated with the interposing phone number. The third-party application 108 can cause the phone tree 114 to be communicated to the customer. In at least one example, the third-party application 108 can use text-to-speech technology to output the phone tree 114 as speech output to the customer. In some examples, the phone tree 114 can be associated with a pre-recorded message, which can be personalized, and the third-party application 108 can access and output the pre-recorded message.

In response to the phone tree 114 being communicated to the customer, the customer can interact with the mobile device 112 to provide an input (i.e., make a selection from the options presented by the phone tree 114). As illustrated, the first path 116-associated with a selection of the number one or two—can (re)direct a customer to a customer-facing user interface 120. Additional details are provided below. A second path 118-associated with a selection of the number three—can connect the incoming phone call directed to the interposing phone number to the original phone number of the merchant 102. In response to the customer providing an input selecting the number three, the third-party application 108 can transfer the phone call to the original phone number of the merchant 102 (555-897-0099).

In response to the customer providing an input selecting the number one (e.g., to place an order for pickup) or the number two (e.g., to place an order for delivery), the third-party application 108 can present a subsequent communication 122 (as dictated by the phone tree 114). The subsequent communication 122 can instruct the customer that he or she must continue online and can provide a prompt to the customer to request access to an online resource. Responsive to the customer providing an input corresponding to the prompt (e.g., selecting the number one), the third-party application 108 can cause a message 124 to be sent to the mobile device 112. The message 124 can include a selectable link 126. When the customer selects the selectable link 126, the mobile device 112 can receive instructions for presenting the customer-facing user interface 120. In some examples, the customer-facing user interface 120 can be presented via a web browser, or the like, that enables the customer to access content via one or more webpages. In other examples, the customer-facing user interface 120 can be presented via an application, such as a mobile application or desktop application, which is provided by the service provider, or which can be an otherwise dedicated application. Such an application can be considered a "customer application." In either example, the customer can interact with the customer-facing user interface 120 to place an order (e.g., for pickup or delivery) and the order 130 can be transmitted to the merchant application 104. The merchant application 104 can facilitate fulfillment of the order 130. As such, the merchant 102 can prepare the order 130, just as if the order 130 had come via an online channel originally. That is, such an order 130 can be integrated into a single workflow with other online orders (even though the order originated as a phone call).

As described above, such techniques can be useful in other applications. For instance, such techniques can be useful in marketplace applications like the one described above (e.g., buying tickets, e-commerce, etc.). That is, techniques described herein can redirect a phone call made to place an order to an online platform for ordering any item, which can include goods or services. Further, techniques described herein can be useful in appointment applications. For instance, if the customer calls to schedule an appointment, techniques described herein can redirect such a customer to an online scheduling system. If the customer schedules an appointment, the merchant can view the appointment in its online calendar, just as if the appointment had been scheduled via an online channel originally. That is, such an appointment can be integrated into a single scheduling system (e.g., online calendar) with other appointments made online (even though the appointment originated as a phone call). In yet an additional example, techniques described herein can be useful in customer service applications. For instance, if the customer calls to inquire about the status of a previous order (e.g., a fulfillment inquiry), techniques described herein can redirect such a customer to an online system which can surface information about the order to the customer.

FIGS. 2-6 are flow diagrams illustrating example processes according to some implementations. The processes of FIGS. 2-6 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 2-6 can be combined with some or all of the operations illustrated in others of FIGS. 2-6. For discussion purposes, the processes are described with reference to the environments, architectures and devices described in FIG. 1 above, although the processes can be implemented in a wide variety of other environments, architectures and devices.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

Figure 2:
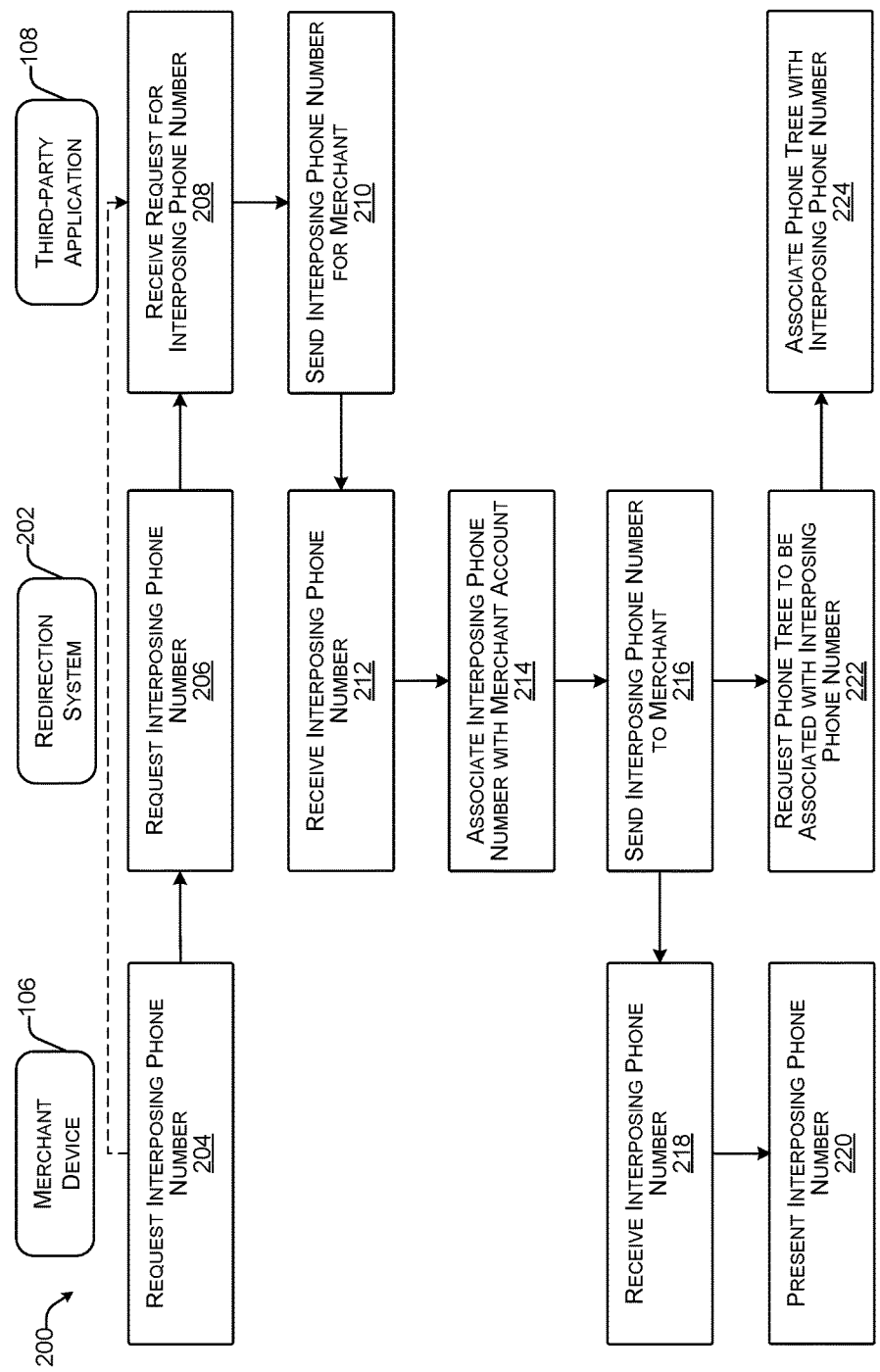
FIG. 2 illustrates an example method for associating an interposing phone number and phone tree with a merchant.

FIG. 2 illustrates an example method 200 for associating an interposing phone number and phone tree with a merchant. In at least one example, the merchant device 106 is capable of communicating with a redirection system 202 and the third-party application 108 (e.g., via a network). As described below with reference to FIG. 7, the redirection system 202 can be associated with one or more serving computing devices of a service provider.

Block 204 illustrates requesting an interposing phone number. As described above, in at least one example, a merchant can request, via the merchant application 104 executing on the merchant device 106, an interposing phone number that is different than its original phone number. In some examples, the merchant application 104 can send the request directly to a third-party application 108 (as shown by the dashed line). In other examples, the merchant application 104 can send the request to the redirection system 202, which can send the request to the third-party application 108, as illustrated in block 206. In some examples, the merchant application 104 can present a graphical user interface that enables a merchant to opt-in to redirection services as described herein, for instance via a dashboard, or during an onboarding process.

Block 208 illustrates receiving the request for the interposing phone number. As described above, the merchant application 104 and/or the redirection system 202 can send the request for the interposing phone number to the third-party application 108. The third-party application 108 can select an interposing phone number for the merchant and can send the interposing phone number for the merchant to the redirection system 202, as illustrated in block 210. The interposing phone number can be different than the original phone number of the merchant and can cause incoming phone calls to be directed to the third-party application 108 instead of the merchant. In at least one example, the interposing phone number can be specific to the merchant. In some examples, a merchant can be associated with multiple interposing phone numbers (and corresponding phone trees).

Block 212 illustrates receiving the interposing phone number. The redirection system 202 can receive the interposing phone number and can associate the interposing phone number with an account of the merchant (e.g., a profile), as illustrated in block 214. That is, in at least one example, the redirection system 202 can map, or otherwise associate the interposing phone number with an account of the merchant. The redirection system 202 can send the interposing phone number to the merchant, as illustrated in block 216, and the merchant device 106 can receive the interposing phone number, as illustrated in block 218. The merchant (or another entity) can utilize the interposing phone number in marketing, place the interposing phone number on its website, or otherwise present the interposing phone number for customers (and others) to view, as illustrated in block 220. In at least one example, a merchant can opt-in to redirection services but can desire to keep its original phone number. In such examples, the merchant can implement call forwarding such that when a customer initiates a call to the original phone number of the merchant, call forwarding will forward the call to the interposing phone number and the third-party application 108.

Block 222 illustrates requesting a phone tree to be associated with the interposing phone number. In at least one example, the redirection system 202 can send a request to the third-party application 108 to associate a phone tree with the interposing phone number. The phone tree can be an option-driven system that routes callers to recordings, more options, or a person, depending on their interactions with the options, as described above. In at least one example, the phone tree can be provisioned as a code block, or other computer-readable instructions, from the redirection system 202 to the third-party application 108. The third-party application 108 can associate the phone tree with the interposing phone number, as illustrated in block 224. That is, the third-party application 108 can store an association between the phone tree and the interposing phone number such that when a call is directed to the interposing phone number, the phone tree is implemented.

As described above, in at least one example, the phone tree can have two or more paths. For instance, a first path can connect an incoming phone call directed to the interposing phone number to the original phone number of the merchant and a second path can direct a customer to a customer-facing user interface, as described above. Other paths are within the scope of this disclosure. In at least one example, each path can be associated with an input such that when the customer provides the respective input, corresponding actions are taken. The input can be a spoken input (e.g., which can be processed by voice recognition software), a touch input (e.g., via a touchscreen display, keyboard, touchpad, etc.), etc. In at least one example, the input drives the interaction between customers and the third-party application 108. The phone tree can be configurable based on the desires and intentions of the redirection system 202. That is, the redirection system 202 can specify scripts, options, inputs, etc. associated with the phone tree, which can be implemented by the third-party application 108.

FIG. 1 illustrates an example phone tree. Another example phone tree can provide options associated with different services of a merchant. For instance, such a phone tree can provide a first option, associated with a first input, for placing orders; a second option, associated with a second input, for scheduling an appointment; a third option, associated a with a input, for accessing some other service; and so on. In an alternate example, a merchant can have multiple interposing phone numbers with phone trees associated with each interposing phone number, for instance, for different services. As an example, a first interposing phone number and associated phone tree can be for placing orders; a second interposing phone number and associated phone tree can be for scheduling appointments; a third interposing phone number and associated phone tree can be for customer service inquiries; and so on.

In at least one example, a phone tree can be particular to a customer (and a merchant). That is, in at least one example, the redirection system 202 can customize a phone tree for a particular customer, for instance by customizing the script (e.g., what is spoken) and/or the options (e.g., paths). In such an example, the phone tree can be associated with a phone number of the customer (or other identifier) and the interposing phone number, such that when an incoming call is determined to originate from the phone number of the customer and is associated with a destination corresponding to the interposing phone number (e.g., of the merchant), the third-party application 108 can access the particular phone tree. In some examples, a phone tree can be configured for a group of customers that have one or more similarities (e.g., loyalty/reward level, geolocation, etc.). In such examples, the phone tree can be associated with the interposing phone number and phone numbers of individual customers in the group of customers.

Furthermore, in some examples a phone tree can be customized (e.g., script, options, etc.) based on a time of day, a day of week, a season, a holiday, an event, etc. In some examples, the phone tree can be associated with the interposing phone number and data indicating the time of day, day of week, etc., such that when an incoming call is determined to be associated with a destination corresponding to the interposing phone number and associated with the time of day, day of week, etc., the third-party application 108 can access the particular phone tree. In some examples, a phone tree can be updated or replaced such to enable customization for a time of day, a day of week, a season, a holiday, an event, etc.

Figure 3:
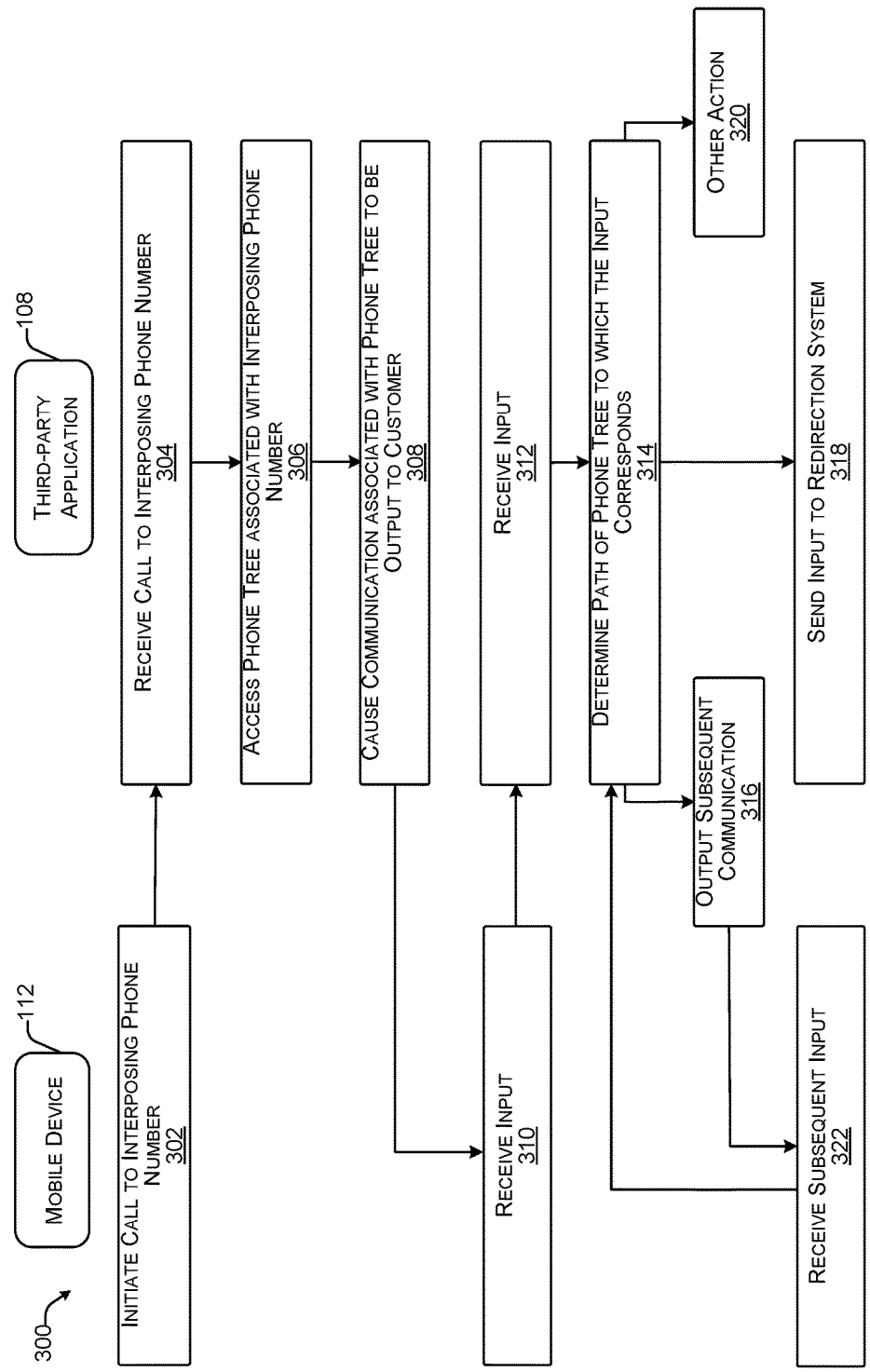
FIG. 3 illustrates an example method for implementing a phone tree in association with an incoming call directed to an associated interposing phone number.

FIG. 3 illustrates an example method 300 for implementing a phone tree in association with an incoming call directed to an associated interposing phone number.

Block 302 illustrates initiating a call to the interposing phone number. In at least one example, a customer can place a call via the mobile device 112 to the interposing phone number. In such an example, a phone number associated with the mobile device 112 can be an "originating" phone number and the interposing phone number can be the "destination" phone number. The call can be received by the third-party application 108, as illustrated in block 304. Upon receiving the call, the third-party application 108 can access the phone tree associated with the interposing phone number, as illustrated in block 306. As described above, in some examples, the phone tree can be customized for a customer (or group of customers) and a merchant, and in such examples, the third-party application 108 can access the phone tree based on the originating phone number and the destination phone number (e.g., the interposing phone number). Furthermore, in some examples, the phone tree can be customized based on a time of day, a day of week, a season, a holiday, an event, etc.

Block 308 illustrates causing a communication associated with the interposing phone tree to be output to the customer. In at least one example, the third-party application 108 can cause the phone tree to be communicated to the customer. In at least one example, the third-party application 108 can use text-to-speech technology to output the phone tree as speech output to the customer. In some examples, the phone tree can be associated with a pre-recorded message, which can be personalized, and the third-party application 108 can access and output the pre-recorded message.

Block 310 illustrates receiving an input. In response to the phone tree being communicated to the customer, the customer can interact with the mobile device 112 to provide an input (i.e., make a selection from the options presented by the phone tree). As illustrated in FIG. 1, a first path 116-associated with a selection of the number one or two—can direct a customer to a customer-facing user interface 120. In such an example, the input may be the number one or two. That is, the customer can speak "one" or "two," interact with a number one or two on a touchscreen display of the mobile device 112, etc. to provide the input. As illustrated in FIG. 1, a second path 118-associated with a selection of the number three—can connect the incoming phone call directed to the interposing phone number to the original phone number of the merchant 102. In such an example, the input may be a number three. That is, the customer can speak "three," interact with a number one on a touchscreen display of the mobile device, etc. to provide the input. Of course, the inputs described are simply for illustrative purposes and should not be construed as limiting. The mobile device 112 can transmit the input (or an indication thereof) to the third-party application 108 and the third-party application 108 can receive the input, as illustrated in block 312.

Block 314 illustrates determining a path of the phone tree to which the input corresponds. In at least one example, the third-party application 108 can receive the input and can compare the input to one or more options of the phone tree. The third-party application 108 can determine that the input corresponds to a particular path (e.g., option) of the phone tree. In at least one example, the path can indicate that, responsive to receiving the input, a subsequent communication is to be provided to the customer. Accordingly, the third-party application 108 can cause a communication associated with the particular path (e.g., the subsequent communication) to be output to the customer, as illustrated in block 316. The subsequent communication can be an instruction to the customer that he or she must continue online, and can provide a prompt to the customer to request access to an online resource (e.g., by providing a particular input). In alternate examples, the path can cause the input to be communicated to the redirection system 202, which can cause the input (or an indication thereof) to be sent to the redirection system 202, as illustrated in block 318. Or, the path can cause another action to occur (e.g., connect the incoming call to the original phone number of the merchant), as illustrated in block 320.

In at least one example, responsive to receiving the subsequent communication, the customer can interact with the mobile device 112 to provide a subsequent input, as illustrated in block 322. The subsequent input can be prompted by the subsequent communication (e.g., "to continue, select one"). In at least one example, the phone tree can indicate that responsive to receiving the subsequent input, the subsequent input is to be forwarded to the redirection system 202. As such, responsive to the customer providing the subsequent input corresponding to the prompt, the third-party application 108 can send the (subsequent) input (or an indication thereof) to the redirection system 202, as illustrated in block 318. In at least one example, the subsequent input (or indication thereof) can be associated with data indicating the originating phone number and the destination phone number. In at least one example, the redirection system 202 can receive the input and can take an action based on the input received. An example is provided below in FIG. 4.

It should be noted that in some examples, only a single input may be required to cause the redirection system 202 to send a message with a link, or otherwise interact with the mobile device 112 (e.g., as shown by the arrow connecting block 314 to block 318). In other examples, one or more subsequent options can be presented to the customer, as illustrated by the arrows from blocks 314 to 322 (and back to block 314). As described above, the phone tree can be configured by the redirection system 202 and/or the merchant application 104.

Figure 4:
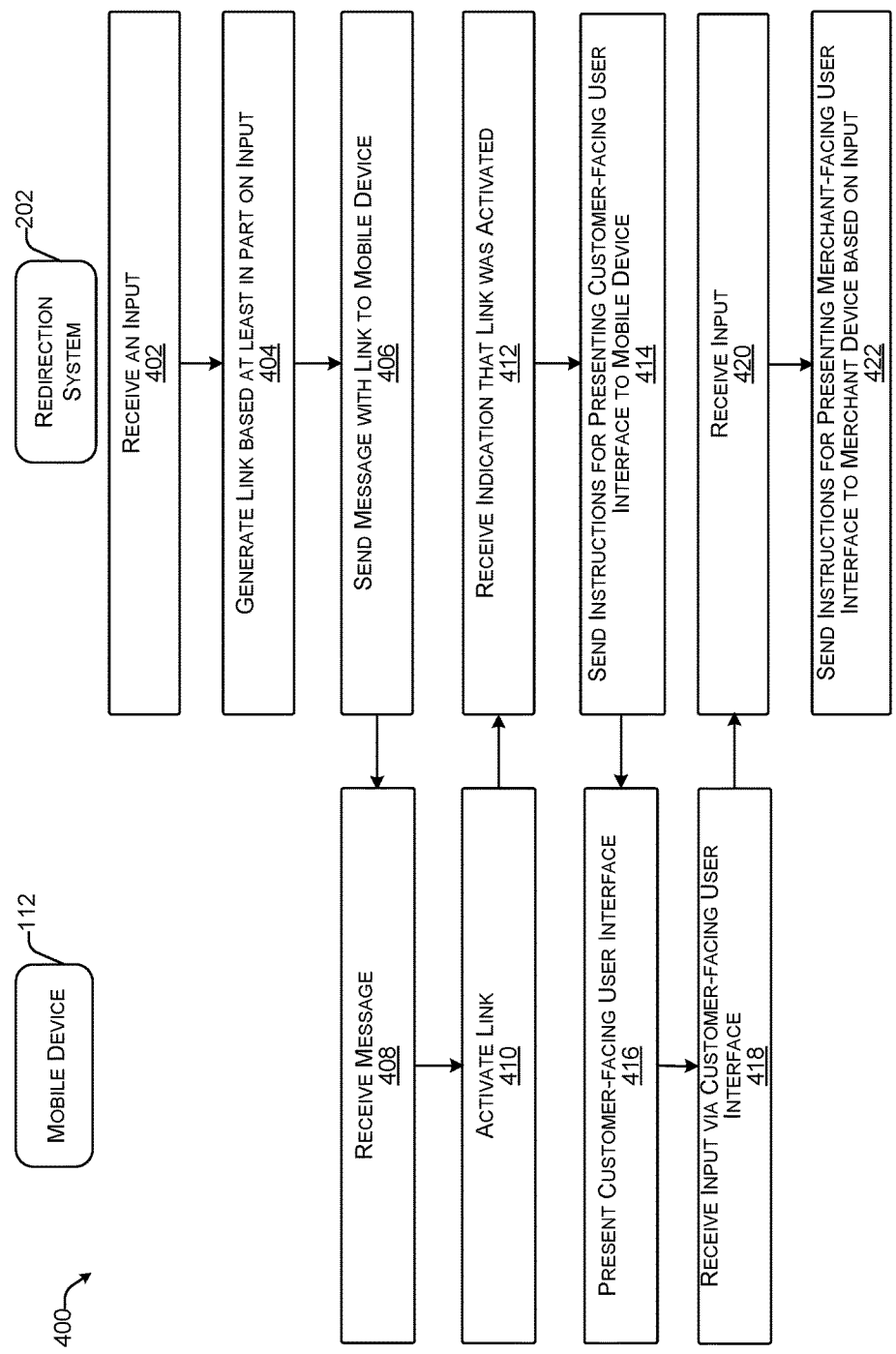
FIG. 4 illustrates an example method for redirecting an incoming call to a customer-facing user interface to enable a customer to make a request.

FIG. 4 illustrates an example method 400 for redirecting an incoming call to a customer-facing user interface to enable a customer to make a request.

Block 402 illustrates receiving an input. As described above with reference to FIG. 3, the third-party application 108 can send indications of inputs to the redirection system 202, per instructions provided in the phone tree. Responsive to receiving the subsequent communication, the customer can interact with the mobile device 112 to provide an input. For instance, the input can be prompted by the subsequent communication (e.g., "to continue, select one"). Responsive to the customer providing an input corresponding to the prompt, the third-party application 108 can send the input (or an indication thereof) to the redirection system 202. Accordingly, the redirection system 202 can receive the input and determine that the input corresponds to a particular action. In at least one example, the input (or indication thereof) can be associated with data indicating the originating phone number and the destination phone number.

Block 404 illustrates generating a link based at least in part on the input. In at least one example, the redirection system 202 can receive the input from the third-party application 108 and can analyze the data associated with the input to inform generation of the link (or other mechanism that enables the customer to access a customer-facing user interface via a corresponding mobile device). That is, the redirection system 202 can utilize data associated with the input and/or the input to inform a state associated with the customer-facing user interface. In at least one example, the redirection system 202 can determine that the input is associated with the merchant based on the data indicating the destination phone number corresponds to the interposing phone number associated with the merchant, and can generate the link and associated content such that when the link is selected, merchant-specific content is presented via the customer-facing user interface. That is, the redirection system 202 can utilize data associated with the input such that the state associated with the customer-facing user interface is particular to the merchant. Additionally or alternatively, in at least one example, the redirection system 202 can determine that the input is associated with the customer based on the data indicating the originating phone number corresponds to the an account associated with the customer, and can generate the link and associated content such that when the link is selected, customer-specific content is presented via the customer-facing user interface. That is, the redirection system 202 can utilize data associated with the input such that the state associated with the customer-facing user interface is particular to the customer. Additional details associated with such personalization are provided below with respect to FIGS. 5 and 6.

In at least one example, the link can be associated with one or more parameters. The parameters can be useful for tracking conversion (e.g., how many users converted from a phone user to an online user) or for determining other data analytics.

Block 406 illustrates sending a message with the link to the mobile device. In at least one example, the redirection system 202 can send a message to the mobile device 112 using the originating phone number (as indicated in the data associated with the second input). The message can include the link. The mobile device 112 can receive the message, as illustrated in block 408, and the customer can activate the link, as illustrated in block 410. As described above, the link can be selectable. The customer can actuate, or otherwise select, the link and the mobile device 112 can send an indication to the redirection system 202 that the link was activated, as illustrated in block 412.

Block 414 illustrates sending instructions for presenting a customer-facing user interface to the mobile device. Based at least in part on receiving the indication that the link was activated, the redirection system 202 can access content corresponding to the link and can send instructions associated with such content to the mobile device 112. In at least one example, the content can be presented via a customer-facing user interface 120. In some examples, the customer-facing user interface 120 can be presented via a web browser. In other examples, the customer-facing user interface 120 can be presented via an application, as described above. In at least one example, the redirection system 202 can determine that the mobile device 112 does not have an instance of the application downloaded thereon and, in such an example, the redirection system 202 can prompt the customer to download an instance of the application in order to view the customer-facing user interface 120. In any case, the mobile device 112 can present the customer-facing user interface 120, as illustrated in block 416.

Block 418 illustrates receiving an input via the customer-facing user interface. In at least one example, the customer can interact with the customer-facing user interface 120 to make a request, or otherwise interact with the merchant and/or the service provider. The request can be for placing an online order (e.g., for pickup or delivery), for scheduling an appointment, for inquiring about a previous order, etc. The mobile device 112 can send the input to the redirection system 202, and the redirection system 202 can receive the input, as illustrated in block 420. In some examples, the input can be associated with an indication that the customer-facing user interface 120 was presented, or otherwise activated, using the link. In at least one example, responsive to receiving the input, the redirection system 202 can send instructions for presenting a merchant-facing user interface (e.g., via the merchant application 104) to the merchant device 106 based on the input, as illustrated in block 422.

As described above with reference to FIG. 1, the customer can interact with the customer-facing user interface 120 to place an order (e.g., for pickup or delivery) and the order can be transmitted to the merchant application 104 executable by the merchant device 106, and the merchant application 104 can facilitate fulfillment of the order. As such, the merchant can prepare the order, just as if the order had come via an online channel originally. That is, the input can be associated with a request to place an order and such an order can be integrated into a single workflow with other online orders (even though the order originated as a phone call).

In an additional or alternative example, the processes described in FIGS. 2-4 can be useful in other marketplace applications (e.g., buying tickets, e-commerce, etc.). Further, techniques described herein can be useful in appointment applications. For instance, if the customer calls to schedule an appointment, techniques described herein can redirect such a customer to an online scheduling system. If the customer schedules an appointment, the merchant can view the appointment in its online calendar, just as if the appointment had been scheduled via an online channel originally. That is, the input can be associated with a request to schedule an appointment and such an appointment can be integrated into a single scheduling system (e.g., online calendar) with other appointments made online (even though the appointment originated as a phone call). In yet an additional example, techniques described herein can be useful in customer service applications, wherein a status of an order or other information associated with an order, or other recent interaction between a customer and a merchant, can be presented or otherwise communicated to the customer.

It should be noted that while FIG. 1 describes the merchant application 104 as being the actor that sends the request for the interposing phone number and the request to associate the interposing phone number with a phone tree, and FIG. 2 describes the redirection system 202 as the actor responsible for such, the merchant application 104 and/or the redirection system 202 can perform any or all of the acts and/or operations as described herein. That is, the merchant application 104 and the redirection system 202 can be interchangeable. Furthermore, while the foregoing description is directed to a third-party application 108, in an alternative example, the service provider (and associated services) can include a widget or application that can perform the same functionality, without requiring the use of a third-party service.

Figure 5:
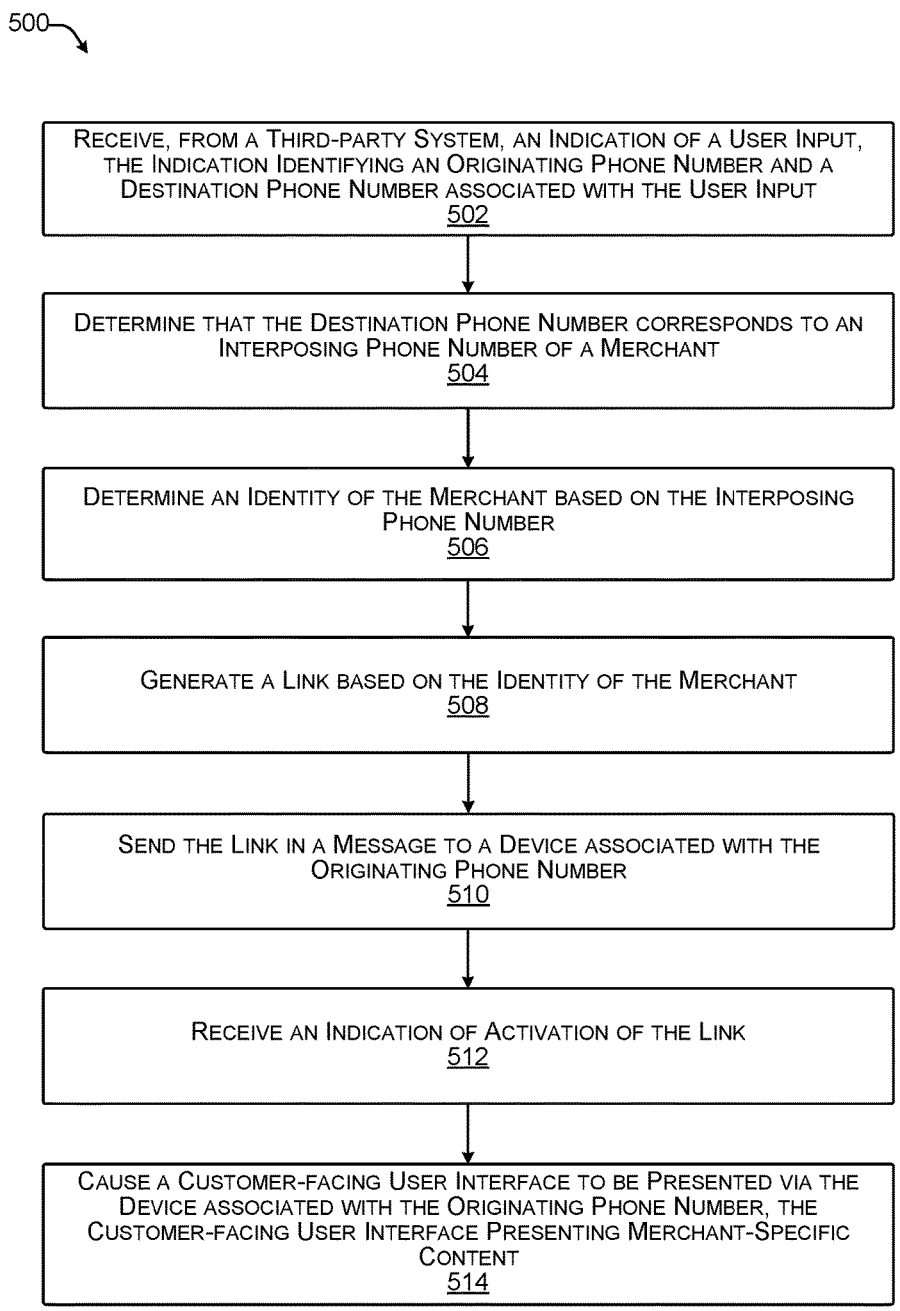
FIG. 5 illustrates an example method for causing a customer-facing user interface to be presented via a mobile device responsive to an incoming call directed to an interposing phone number, wherein the customer-facing user interface is associated with merchant-specific content.

FIG. 5 illustrates an example method 500 for causing a customer-facing user interface to be presented via a mobile device responsive to an incoming call directed to an interposing phone number, wherein the customer-facing user interface is associated with merchant-specific content.

Block 502 illustrates receiving, from a third-party system, an indication of a user input, the indication identifying an originating phone number and a destination phone number associated with the user input. As described above with reference to FIG. 3, a customer can interact with the mobile device 112 to provide an input selecting an option of a phone tree. Responsive to the customer providing the user input, the third-party application 108 can send the user input (or an indication thereof) to the redirection system 202. Accordingly, the redirection system 202 can receive the user input. In at least one example, the user input (or indication thereof) can be associated with data indicating the originating phone number and the destination phone number.

Block 504 illustrates determining that the destination phone number corresponds to an interposing phone number of a merchant. As described above with reference to FIG. 1, a merchant can be associated with an interposing phone number (provided by the third-party application 108). The interposing phone number can be associated with a phone tree that is implemented by the third-party application 108 when an incoming call is placed to the interposing phone number. The interposing phone number can be mapped to, or otherwise associated with, an account of a merchant. In at least one example, responsive to receiving the user input, the redirection system 202 can compare the destination phone number with stored instances of interposing phone numbers and can determine that the destination phone number corresponds to an interposing phone number of a particular merchant. Based on determining that the destination phone number corresponds to an interposing phone number of a particular merchant, the redirection system 202 can access the account of the merchant and determine the identity of the merchant, as illustrated in block 506.

Block 508 illustrates generating a link based on the identity of the merchant. In at least one example, the redirection system 202 can leverage information associated with the account of the merchant to generate a link that is to be sent to the customer. For instance, the redirection system 202 can determine a landing page particular to the merchant and can generate the link such that when the link is selected, the landing page particular to the merchant is presented via the customer-facing user interface 120. That is, the redirection system 202 can utilize data associated with the user input to access (or generate) content particular to the merchant such that the state associated with the customer-facing user interface 120 is particular to the merchant.

Block 510 illustrates sending the link in a message to a device associated with the originating phone number. In at least one example, the redirection system 202 can send a message to the mobile device 112 using the originating phone number (as indicated in the data associated with the user input). The message can include the link. The mobile device 112 can receive the message and the customer can activate the link. The customer can actuate, or otherwise select, the link and the mobile device 112 can send an indication to the redirection system 202 that the link was activated. As such, the redirection system 202 can receive an indication of activation of the link, as illustrated in block 512.

Block 514 illustrates causing a customer-facing user interface to be presented via the device associated with the originating phone number, the customer-facing user interface presenting merchant-specific content. Responsive to receiving an indication of activation of the link, the redirection system 202 can access content corresponding to the link and can send instructions associated with such content to the mobile device 112. In at least one example, the content can be presented via a customer-facing user interface 120. In some examples, the customer-facing user interface 120 can be presented via a web browser. In other examples, the customer-facing user interface 120 can be presented via an application executing on the mobile device 112, as described above. In at least one example, the redirection system 202 can determine that the mobile device 112 does not have an instance of the application downloaded thereon and, in such an example, the redirection system 202 can prompt the customer to download an instance of the application in order to view the customer-facing user interface 120. In any case, the mobile device 112 can present the customer-facing user interface 120 which can include merchant-specific content. That is, the redirection system 202 can utilize data associated with the user input such that the state associated with the customer-facing user interface 120 is particular to the merchant. As non-limiting examples, the customer-facing user interface 120 can present a merchant-specific landing page (e.g., order page, e-commerce website, etc.), a merchant-specific appointment schedule, etc.

Figure 6:
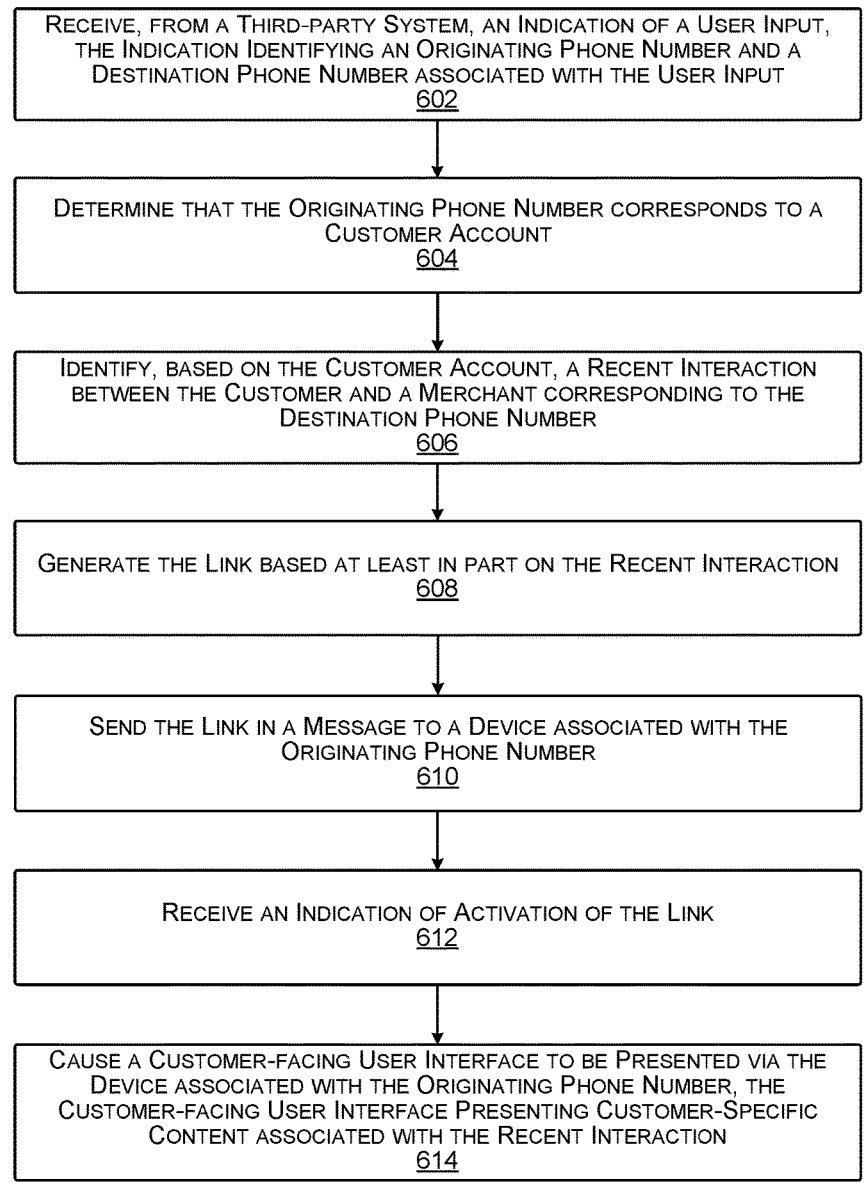
FIG. 6 illustrates an example method for causing a customer-facing user interface to be presented via a mobile device responsive to an incoming call directed to an interposing phone number, wherein the customer-facing user interface is associated with customer-specific content.

FIG. 6 illustrates an example method 600 for causing a customer-facing user interface to be presented via a mobile device responsive to an incoming call directed to an interposing phone number, wherein the customer-facing user interface is associated with customer-specific content.

Block 602 illustrates receiving, from a third-party system, an indication of a user input, the indication identifying an originating phone number and a destination phone number associated with the user input. As described above with reference to FIG. 3, a customer can interact with the mobile device 112 to provide an input selecting an option of a phone tree. Responsive to the customer providing the user input, the third-party application 108 can send the user input (or an indication thereof) to the redirection system 202. Accordingly, the redirection system 202 can receive the user input. In at least one example, the user input (or indication thereof) can be associated with data indicating the originating phone number and the destination phone number.

Block 604 illustrates determining that the originating phone number corresponds to a customer account. In at least one example, responsive to receiving the user input, the redirection system 202 can compare the originating phone number with stored instances of phone numbers associated with customer accounts and can determine that the originating phone number corresponds to a phone number of a particular customer. Based on determining that the originating phone number corresponds to a phone number of a particular customer, the redirection system 202 can access the account of the customer. Based at least in part on accessing the account of the customer, the redirection system 202 can identify interactions between the customer and one or more merchants. For instance, the customer account can indicate customer data (e.g., name, phone number, address, banking information, etc.), order data (e.g., identifying one or more items purchases, payment instruments used to purchase the one or more items, returns associated with one or more orders, statuses one or more orders (e.g., preparing, packing, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), customer service data, etc. In at least one example, the redirection system 202 can leverage the destination number to identify a particular merchant and can identify one or more interactions associated with the particular merchant. In some examples, the redirection system 202 can identify a recent interaction between the customer and the merchant, as illustrated in block 606, based at least in part on an interaction that was last-in-time, last-in-time and not fulfilled, occurred within a threshold amount of time, etc. In another example, the redirection system 202 can identify any number of interactions to surface to the customer.

Block 608 illustrates generating a link based on the recent interaction. In at least one example, the redirection system 202 can leverage information associated with the account of the customer to generate a link that is to be sent to the customer. For instance, the redirection system 202 can determine a landing page particular to the customer (e.g., that includes content associated with the recent interaction) and can generate the link such that when the link is selected, the landing page particular to the customer is presented via the customer-facing user interface 120. That is, the redirection system 202 can utilize data associated with the user input to access (or generate) content particular to the customer such that the state associated with the customer-facing user interface 120 is particular to the customer.

Block 610 illustrates sending the link in a message to a device associated with the originating phone number. In at least one example, the redirection system 202 can send a message to the mobile device 112 using the originating phone number (as indicated in the data associated with the user input). The message can include the link. The mobile device 112 can receive the message and the customer can activate the link. The customer can actuate, or otherwise select, the link and the mobile device 112 can send an indication to the redirection system 202 that the link was activated. As such, the redirection system 202 can receive an indication of activation of the link, as illustrated in block 612.

Block 614 illustrates causing a customer-facing user interface to be presented via the device associated with the originating phone number, the customer-facing user interface presenting customer-specific content associated with the recent interaction. Responsive to receiving an indication of activation of the link, the redirection system 202 can access content corresponding to the link and can send instructions associated with such content to the mobile device 112. In at least one example, the content can be presented via a customer-facing user interface 120. In some examples, the customer-facing user interface 120 can be presented via a web browser. In other examples, the customer-facing user interface 120 can be presented via an application executing on the mobile device 112, as described above. In at least one example, the redirection system 202 can determine that the mobile device 112 does not have an instance of the application downloaded thereon and, in such an example, the redirection system 202 can prompt the customer to download an instance of the application in order to view the customer-facing user interface 120. In any case, the mobile device 112 can present the customer-facing user interface 120 which can include customer-specific content. For instance, the customer-specific content can be associated with the recent interaction. As a non-limiting example, the customer-specific content can indicate status information of a recent order, information about an upcoming appointment, etc.

Figure 7:
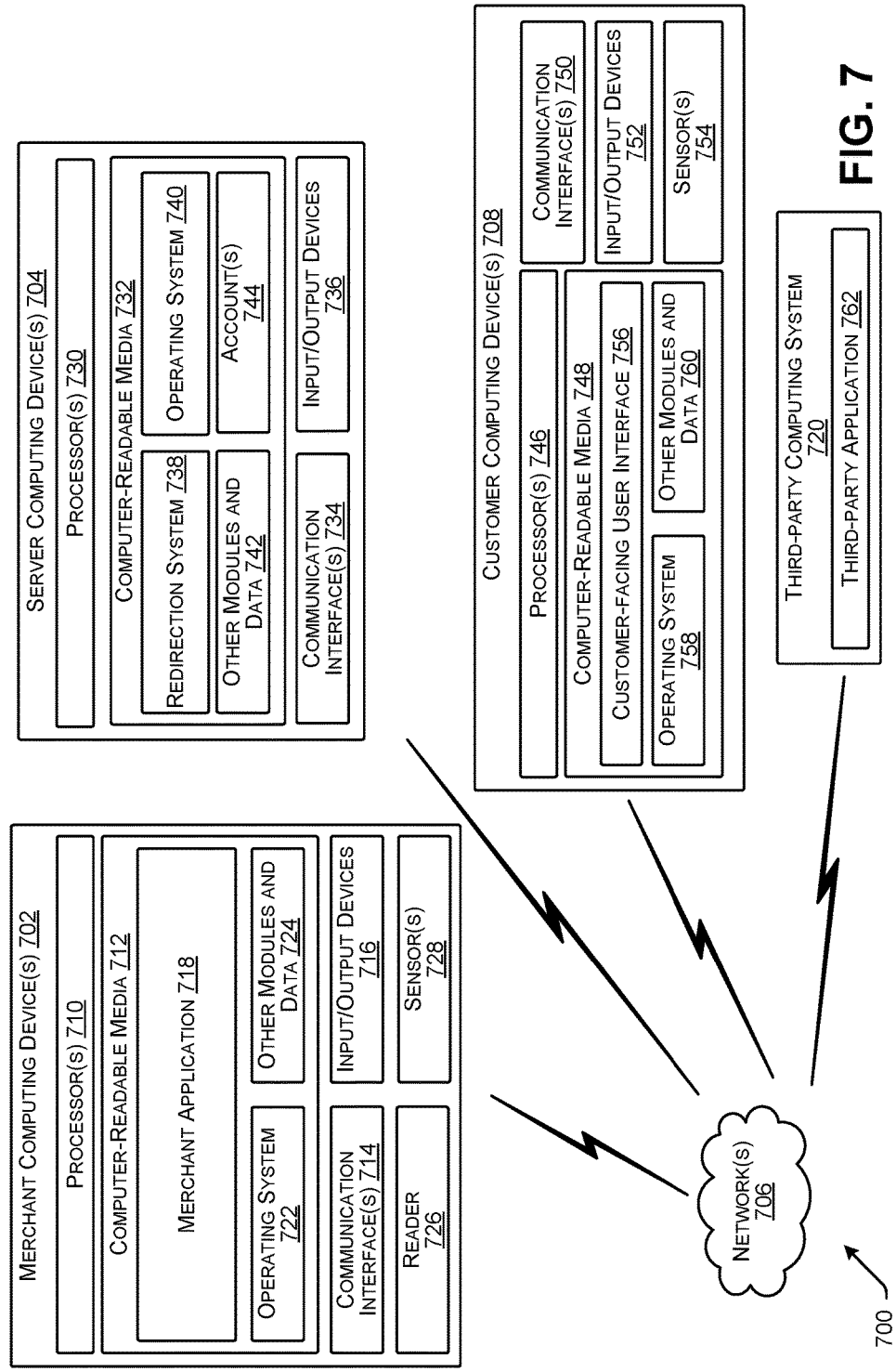
FIG. 7 illustrates an example system for utilizing an interposing phone number and associated phone tree to direct phone calls intended for a merchant to a customer-facing user interface that facilitates online requests to integrate multiple input channels (e.g., requests made by phone and requests made online) into a single output workflow.

FIG. 7 illustrates an example system 700 for utilizing an interposing phone number and associated phone tree to direct phone calls intended for a merchant to a customer-facing user interface that facilitates online requests to integrate multiple input channels (e.g., requests made by phone and requests made online) into a single output workflow. The system 700 includes merchant computing device(s) 702 (operated by merchant(s)) that communicate with server computing device(s) 704 (which can be associated with a service provider) via network(s) 706 (e.g., the Internet, cable network(s), cellular network(s), wireless network(s) (e.g., Wi-Fi) and wired network(s), as well as close-range communications such as Bluetooth®, Bluetooth® low energy, and the like). Additionally, in at least one example, one or more customer computing devices 708 can communicate with the merchant computing device(s) 702, server computing device(s) 704, and/or other customer computing device(s) 708 via the network(s) 706.

In at least one example, the merchant computing device(s) 702 and/or customer computing device(s) 708 can be any suitable type of computing device, e.g., portable, semi-portable, semi-stationary, or stationary. Some examples of the merchant computing device(s) 702 and/or customer computing device(s) 708 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein. Merchant device 106 and mobile device 112, as described above with respect to FIG. 1, can correspond to merchant computing device(s) 702 and customer computing device(s) 708, respectively.

In the illustrated example, the merchant computing device(s) 702 include one or more processors 710, one or more computer-readable media 712, one or more communication interfaces 714, and one or more input/output (I/O) devices 716. Each processor 710 can itself comprise one or more processors or processing cores. For example, the processor(s) 710 can be implemented as one or more microprocessors, microcomputers, microcontrollers, digital signal processors, central processing units, state machines, logic circuitries, and/or any devices that manipulate signals based on operational instructions. In some examples, the processor(s) 710 can be one or more hardware processors and/or logic circuits of any suitable type specifically programmed or configured to execute the algorithms and processes described herein. The processor(s) 710 can be configured to fetch and execute computer-readable processor-executable instructions stored in the computer-readable media 712.

Depending on the configuration of the merchant computing device(s) 702, the computer-readable media 712 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 712 can include, but is not limited to, RAM, ROM, EEPROM, flash memory, solid-state storage, magnetic disk storage, optical storage, and/or other computer-readable media technology. Further, in some examples, the merchant computing device(s) 702 can access external storage, such as RAID storage systems, storage arrays, network attached storage, storage area networks, cloud storage, or any other medium that can be used to store information and that can be accessed by the processor(s) 710 directly or through another computing device or network. Accordingly, the computer-readable media 712 can be computer storage media able to store instructions, modules or components that can be executed by the processor(s) 710. Further, when mentioned, non-transitory computer-readable media exclude media such as energy, carrier signals, electromagnetic waves, and signals per se.

The computer-readable media 712 can be used to store and maintain any number of functional components that are executable by the processor(s) 710. In some implementations, these functional components comprise instructions or programs that are executable by the processor(s) 710 and that, when executed, implement operational logic for performing the actions and services attributed above to the merchant computing device(s) 702. Functional components stored in the computer-readable media 712 can include a merchant application 718. In at least one example, the merchant application 718 can provide point-of-sale functionality to the merchant computing device(s) 702 to enable the merchant to accept payments from one or more customers at a point-of-sale location. For example, the merchant can use the merchant computing device(s) 702 to accept payments through various different types of payment instruments, e.g., payment cards, electronic payment, cash or check, cryptocurrency, etc. at the point-of-sale location from the one or more customers.

In at least one example, the merchant application 718 can present various user interfaces to enable a merchant to conduct transactions, receive payments, and so forth. In at least one example, the merchant application 718 can send data associated with the transactions (e.g., transaction data) to the server computing device(s) 704. Further, the merchant application 718 can enable the merchant to manage transactions, payments, and so forth, via a dashboard. For the purpose of this discussion, a dashboard can be a user interface that provides an at-a-glance view of key information (e.g., associated with transactions, payments, etc.). In at least one example, the merchant application 718 can facilitate merchant onboarding (e.g., to services offered by the service provider), which can include adding redirection services as described herein.

In at least one example, the merchant application 718 can enable a merchant to set-up redirection services (e.g., during onboarding, or at a later time) by requesting an interposing phone number from a third-party computing system 720, directly or indirectly, as described above, and associating a phone tree with the interposing phone number. That is, the merchant application 718 can correspond to the merchant application 104 described above with reference to FIG. 1.

Furthermore, the computer-readable media 712 can include additional functional components, such as an operating system 722 for controlling and managing various functions of the merchant computing device(s) 702 and for enabling basic user interactions. In addition, the computer-readable media 712 can also store data, data structures and the like, that are used by the functional components. Depending on the type of the merchant computing device(s) 702, the computer-readable media 712 can also optionally include other functional components and data, such as other modules and data 724, which can include programs, drivers, etc., and the data used or generated by the functional components. For instance, in some examples, the merchant computing device(s) 702 can include a payroll module, an inventory management module, an employee management module, a financing module, an appointment module, etc., which can facilitate payroll services, inventory management services, employee management services, financing services, appointment services, etc., respectively. Further, the merchant computing device(s) 702 can include many other logical, programmatic and physical components, of which those described are merely examples that are related to the discussion herein.

The communication interface(s) 714 can include one or more interfaces and hardware components for enabling communication with various other devices, such as over the network(s) 706 or directly. For example, communication interface(s) 714 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The merchant computing device(s) 702 can further include the one or more I/O devices 716. The I/O devices 716 can include speakers, a microphone, a camera, a display (e.g., a liquid crystal display, a plasma display, a light emitting diode display, an OLED (organic light-emitting diode) display, an electronic paper display, or any other suitable type of display able to present digital content thereon), and various user controls (e.g., buttons, a joystick, a keyboard, a keypad, etc.), a haptic output device, and so forth.

In addition, in some examples, the merchant computing device(s) 702 can include or can be connectable to a reader 726, for reading payment instruments. In some examples, the reader 726 can plug in to a port in the merchant computing device(s) 702, such as a microphone/headphone port, a data port, or other suitable port. The reader 726 can include a read head for reading a magnetic strip of a payment card, and further can include encryption technology for encrypting the information read from the magnetic strip. Additionally or alternatively, the reader 726 can be a Europay, MASTERCARD®, VISA® (EMV) payment reader. Moreover, numerous other types of readers can be employed with the merchant computing device(s) 702 herein, depending on the type and configuration of the merchant computing device(s) 702.

Further, the merchant computing device(s) 702 can include one or more sensors 728 such as an accelerometer, gyroscope, compass, proximity sensor, camera, microphone, and/or a switch, a GPS sensor, etc. Additionally, the merchant computing device(s) 702 can include various other components that are not shown, examples of which include removable storage, a power source, such as a battery and power control unit, a barcode scanner, a printer, a cash drawer, and so forth.

The server computing device(s) 704 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server computing device(s) 704 as being present in a single location, these components and data can alternatively be distributed across different computing devices and different locations in any manner. Consequently, the functions can be implemented by one or more server computing devices, with the various functionality described above distributed in various ways across the different computing devices. Multiple server computing device(s) 704 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server computing device(s) 704 can include one or more processors 730, one or more computer-readable media 732, one or more communication interfaces 734, and one or more input/output devices 736. Each processor 730 can be a single processing unit or a number of processing units, and can include single or multiple computing units or multiple processing cores. The processor(s) 730 can be implemented as one or more microprocessors, microcomputers, microcontrollers, digital signal processors, central processing units, state machines, logic circuitries, and/or any devices that manipulate signals based on operational instructions. For example, the processor(s) 730 can be one or more hardware processors and/or logic circuits of any suitable type specifically programmed or configured to execute the algorithms and processes described herein. The processor(s) 730 can be configured to fetch and execute computer-readable instructions stored in the computer-readable media 732, which can program the processor(s) 730 to perform the functions described herein.

The computer-readable media 732 can include volatile and nonvolatile memory and/or removable and non-removable media implemented in any type of technology for storage of information, such as computer-readable instructions, data structures, program modules, or other data. Such computer-readable media 732 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server computing device(s) 704, the computer-readable media 732 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 732 can be used to store any number of functional components that are executable by the processors 730. In many implementations, these functional components comprise instructions or programs that are executable by the processors 730 and that, when executed, specifically configure the one or more processors 730 to perform the actions attributed above to the service provider and/or service provider. Functional components stored in the computer-readable media 732 can include a redirection system 738, which can correspond to the redirection system 202, as described above with reference to FIGS. 2-6.

Additional functional components stored in the computer-readable media 732 can include an operating system 740 for controlling and managing various functions of the server computing device(s) 704.

In at least one example, the computer-readable media 732 can include or maintain other functional components and data, such as other modules and data 742, which can include programs, drivers, etc., and the data used or generated by the functional components. Further, the server computing device(s) 704 can include many other logical, programmatic and physical components, of which those described above are merely examples that are related to the discussion herein.

In addition, the computer-readable media 732 can store data used for performing the operations described herein. For instance, the computer-readable media 732 can store account(s) 744. In at least one example, the account(s) 744 can correspond to merchant accounts, customer accounts, etc. In at least one example, the account(s) 744 can store information associated with individual merchant(s), customer(s), etc. For instance, a merchant account of the account(s) 744 can store merchant data including, but not limited to, an identifier of the merchant, a MCC, item(s) offered for sale by the merchant, transaction data associated with transactions conducted by the merchant (e.g., via the merchant application 718), hardware (e.g., device type) used by the merchant, etc. In at least one example, one or more interposing phone numbers and corresponding phone trees associated with a merchant can be stored in a corresponding merchant account of the account(s) 744.

A customer account of the account(s) 744 can store customer data (e.g., name, phone number, address, banking information, etc.), order data (e.g., identifying one or more items purchases, payment instruments used to purchase the one or more items, returns associated with one or more orders, statuses one or more orders (e.g., preparing, packing, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), customer service data, etc.

The communication interface(s) 734 can include one or more interfaces and hardware components for enabling communication with various other devices, such as over the network(s) 706. For example, communication interface(s) 734 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The server computing device(s) 704 can further be equipped with various input/output (I/O) devices 736. Such I/O devices 736 can include a display, various user interface controls (e.g., buttons, joystick, keyboard, mouse, touch screen, etc.), audio speakers, connection ports and so forth.

In the illustrated example, the customer computing device(s) 708 include one or more processors 746, one or more computer-readable media 748, one or more communication interfaces 750, one or more input/output (I/O) devices 752, and one or more sensors 754. Each processor 746 can itself comprise one or more processors or processing cores. For example, the processor(s) 746 can be implemented as one or more microprocessors, microcomputers, microcontrollers, digital signal processors, central processing units, state machines, logic circuitries, and/or any devices that manipulate signals based on operational instructions. In some examples, the processor(s) 746 can be one or more hardware processors and/or logic circuits of any suitable type specifically programmed or configured to execute the algorithms and processes described herein. The processor(s) 746 can be configured to fetch and execute computer-readable processor-executable instructions stored in the computer-readable media 748.

Depending on the configuration of the customer computing device(s) 708, the computer-readable media 748 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 748 can include, but is not limited to, RAM, ROM, EEPROM, flash memory, solid-state storage, magnetic disk storage, optical storage, and/or other computer-readable media technology. Further, in some examples, the customer computing device(s) 708 can access external storage, such as RAID storage systems, storage arrays, network attached storage, storage area networks, cloud storage, or any other medium that can be used to store information and that can be accessed by the processor(s) 746 directly or through another computing device or network. Accordingly, the computer-readable media 748 can be computer storage media able to store instructions, modules or components that can be executed by the processor(s) 746. Further, when mentioned, non-transitory computer-readable media exclude media such as energy, carrier signals, electromagnetic waves, and signals per se.

The computer-readable media 748 can be used to store and maintain any number of functional components that are executable by the processor(s) 746. In some implementations, these functional components comprise instructions or programs that are executable by the processor(s) 746 and that, when executed, implement operational logic for performing the actions and services attributed above to the customer computing device(s) 708. Functional components stored in the computer-readable media 748 can include a customer-facing user interface 756, which can correspond to the customer-facing user interface 120 described above with reference to FIG. 1. In some examples, the customer-facing user interface 756 can be presented via a web browser, or the like, that enables the customer to access content via one or more webpages. In other examples, the customer-facing user interface 756 can be presented via an application, such as a mobile application or desktop application, which is provided by the service provider, or which can be an otherwise dedicated application. In at least one example, the customer-facing user interface 756 can be accessed in response to receiving a message with a link from the server computing device(s) 704 (or the merchant application 718).

Furthermore, the computer-readable media 748 can include additional functional components, such as an operating system 758 for controlling and managing various functions of the customer computing device(s) 708 and for enabling basic user interactions. In addition, the computer-readable media 748 can also store data, data structures and the like, that are used by the functional components. Depending on the type of the customer computing device(s) 708, the computer-readable media 748 can also optionally include other functional components and data, such as other modules and data 760, which can include programs, drivers, etc., and the data used or generated by the functional components. Further, the customer computing device(s) 708 can include many other logical, programmatic and physical components, of which those described are merely examples that are related to the discussion herein.

The communication interface(s) 750 can include one or more interfaces and hardware components for enabling communication with various other devices, such as over the network(s) 706 or directly. For example, communication interface(s) 750 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The customer computing device(s) 708 can further include the one or more I/O devices 752. The I/O devices 752 can include speakers, a microphone, a camera, a display (e.g., a liquid crystal display, a plasma display, a light emitting diode display, an OLED (organic light-emitting diode) display, an electronic paper display, or any other suitable type of display able to present digital content thereon), and various user controls (e.g., buttons, a joystick, a keyboard, a keypad, etc.), a haptic output device, and so forth.

Further, the customer computing device(s) 708 can include one or more sensors 754, such as an accelerometer, gyroscope, compass, proximity sensor, camera, microphone, and/or a switch, a GPS sensor, etc.

In at least one example, the merchant computing device(s) 702, the server computing device(s) 704, and/or the customer computing device(s) 708 can communicate among each other and/or with the third-party computing system 720, via the network(s) 706. In at least one example, the third-party computing system 720 can include a third-party application 762, which corresponds to the third-party application 108 described above with reference to FIGS. 1-6.

Furthermore, the foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method comprising;
   receiving, at a merchant-facing marketplace application executing on a merchant device, a user input by a merchant indicating a request for an interposing phone number;
   requesting, by the merchant-facing marketplace application, the interposing phone number from a third-party service;
   receiving, by the merchant-facing marketplace application, the interposing phone number from the third-party service, the interposing phone number for presentation by the merchant on a merchant web site in association with items offered for sale by the merchant;
   requesting, by the merchant-facing marketplace application, that the third-party service implement an interposing phone tree in association with incoming calls directed to the interposing phone number, wherein the interposing phone tree includes:
   (i) a first path for connecting a phone call placed to the interposing phone number with an original phone number of the merchant, and
   (ii) a second path for sending, to a phone that placed the phone call to the interposing phone number, a message including a link to a customer-facing marketplace application, wherein the customer-facing marketplace application is configured to send orders for an item of the items offered for sale by the merchant to the merchant-facing marketplace application;
   receiving, at a server associated with the customer-facing marketplace application and the merchant-facing marketplace application, an indication from an instance of the customer-facing marketplace application that the instance was activated using the link;
   receiving, at the server, an order from the customer-facing marketplace application, the order identifying an item that a customer desires to purchase from the merchant; and
   transmitting, by the server, the order to the merchant-facing marketplace application, the merchant-facing marketplace application enabling the merchant to fulfill the order.

2. The method as claim 1 recites, wherein the second path is associated with a pickup order or a delivery order.

3. The method as claim 1 recites, further comprising:
   determining an identity of the merchant; and
   sending, to the customer-facing marketplace application, instructions to present an order page associated with the merchant via the customer-facing marketplace application.

4. A system comprising:
   one or more processors; and
   one or more computer-readable media storing instructions executable by the one or more processors, wherein the instructions, when executed by the one or more processors, cause the one or more processors to perform acts comprising:
   requesting, by a first application associated with a merchant, an interposing phone number from a third-party service;
   receiving, by the first application, the interposing phone number from the third-party service, the interposing phone number for presentation by the merchant on a merchant promotional resource in association with Items offered for sale by the merchant;
   requesting, by the first application, that the third-party service implement an interposing phone tree in association with an incoming call directed to the interposing phone number, wherein a path of the interposing phone tree causes a message including a link to be sent to a mobile device associated with the incoming call;
   receiving, at a server associated with the first application, an indication of activation of the link; and
   sending, from the server and responsive to receiving the indication of the activation of the link, an instruction to the mobile device, the instruction causing a customer-facing user interface to be presented via the mobile device to enable a customer to interact with the merchant.

5. The system as claim 4 recites, wherein the interposing phone tree includes an additional path for connecting a phone call placed to the interposing phone number with an original phone number of the merchant.

6. The system as claim 4 recites wherein the path is associated with placing an order for pickup or delivery.

7. The system as claim 4 recites, wherein the path is associated with scheduling an appointment.

8. The system as claim 4 recites, wherein the path is associated with a customer service inquiry.

9. The system as claim 8 recites, the acts further comprising:
   determining, based at least in part on a phone number associated with the incoming call, a profile associated with the customer;
   determining, based at least in part on the profile associated with the customer, an interaction between the customer and the merchant; and
   sending, to the mobile device and responsive to receiving the indication of the activation of the link, an additional instruction to present, via the customer-facing user interface, content corresponding to information associated with the interaction in response to the customer service inquiry.

10. The system as claim 4 recites, wherein the customer-facing user interface is presented via a browser.

11. The system as claim 4 recites, wherein the customer-facing user interface is presented via a second application stored on the mobile device.

12. The system as claim 4 recites, the acts further comprising:
responsive to sending the message with the link, receiving an order from the mobile device, the order identifying an item that the customer desires to purchase from the merchant; and
transmitting the order to a merchant-facing marketplace application, the merchant-facing marketplace application enabling the merchant to fulfill the order, wherein the merchant-facing marketplace application is the first application or a second application associated with the merchant.

13. The system as claim 4 recites, further comprising:
determining an identity of the merchant; and
sending, to the mobile device and responsive to receiving the indication of the activation of the link, an additional instruction to present content corresponding to the merchant via the customer-facing user interface.

14. A method comprising:
requesting, via a merchant-facing user interface associated with a merchant, an interposing phone number from a third-party service;
receiving, via the merchant-facing user interface, the interposing phone number from the third-party service, the interposing phone number for presentation by the merchant on a merchant promotional resource in association with items offered for sale by the merchant;
associating, by one or more server computing devices associated with the merchant-facing user interface, the interposing phone number with a merchant profile of the merchant;
requesting, via the merchant-facing user interface, that the third-party service implement an interposing phone tree in association with an incoming call directed to the interposing phone number, wherein a path of the interposing phone tree causes a message including a link to be sent to a mobile device associated with the incoming call;
receiving, at the one or more server computing devices, an indication of an activation of the link; and
sending, from the one or more server computing devices and responsive to receiving the indication of the activation of the link, an instruction to the mobile device, the instruction causing a customer-facing user interface to be presented via the mobile device to enable a customer to interact with the merchant.

15. The method as claim 14 recites, wherein the promotional resource comprises a web site or an item for marketing to one or more customers of the merchant.

16. The method as claim 14 recites, further comprising:
receiving, from the third-party service, a notification of a user input; and
responsive to receiving the notification, sending the message including the link to the mobile device.

17. The method as claim 16 recites, further comprising:
determining, based on the notification, an identity of the merchant; and
sending, to the mobile device, an additional instruction to present content corresponding to the merchant via the customer-facing user interface.

18. The method as claim 14 recites, further comprising:
receiving a customer interaction comprising an order identifying an item that the customer desires to purchase from the merchant; and
transmitting the order to a merchant-facing marketplace application, the merchant-facing marketplace application enabling the merchant to fulfill the order, wherein the merchant-facing user interface is presented via the merchant-facing marketplace application.

19. The method as claim 14 recites, further comprising:
receiving a customer interaction comprising an appointment; and
transmitting the request for the appointment to a merchant-facing application, the merchant-facing marketplace application enabling the merchant to schedule the appointment, wherein the merchant-facing user interface is presented via the merchant-facing marketplace application.

20. The method as claim 14 recites, further comprising:
determining, based at least in part on a phone number associated with the incoming call, a profile associated with the customer;
determining a recent interaction based at least in part on the profile associated with the customer; and
generating the link based at least in part on the recent interaction.

* * * * *